(12) United States Patent
Hucker et al.

(10) Patent No.: US 9,136,563 B2
(45) Date of Patent: Sep. 15, 2015

(54) RECHARGEABLE BATTERIES

(75) Inventors: Martyn John Hucker, Bristol (GB); Michael Dunleavy, Bishopston (GB); Amy Elizabeth Dyke, Aust (GB); Sajad Haq, Bristol (GB)

(73) Assignee: BAE SYSTEMS PLC, London (GB)

( * ) Notice: Subject to any disclaimer, the term of this patent is extended or adjusted under 35 U.S.C. 154(b) by 185 days.

(21) Appl. No.: 13/577,887

(22) PCT Filed: Feb. 9, 2011

(86) PCT No.: PCT/GB2011/050218
§ 371 (c)(1),
(2), (4) Date: Aug. 8, 2012

(87) PCT Pub. No.: WO2011/098794
PCT Pub. Date: Aug. 18, 2011

(65) Prior Publication Data
US 2012/0308887 A1 Dec. 6, 2012

(30) Foreign Application Priority Data

Feb. 9, 2010 (GB) .................................. 1002040.2
Mar. 17, 2010 (GB) .................................. 1004474.1

(51) Int. Cl.
*H01M 2/14* (2006.01)
*H01M 4/64* (2006.01)
(Continued)

(52) U.S. Cl.
CPC ............ *H01M 10/058* (2013.01); *H01M 2/164* (2013.01); *H01M 2/1606* (2013.01); *H01M 2/1673* (2013.01); *H01M 4/0416* (2013.01); *H01M 4/139* (2013.01); *H01M 4/26* (2013.01); *H01M 4/62* (2013.01); *H01M 4/621* (2013.01);
(Continued)

(58) Field of Classification Search
USPC ..................................... 429/211, 246; 427/77
See application file for complete search history.

(56) References Cited

U.S. PATENT DOCUMENTS 3,853,624 A   12/1974   Brown et al.
5,124,508 A    6/1992   DuBrucq
(Continued)

FOREIGN PATENT DOCUMENTS

CN   2158136 Y      3/1994
EP   0 353 837 A1   2/1990
(Continued)

OTHER PUBLICATIONS

Search Report dated Dec. 10, 2010, issued in corresponding United Kingdom Patent Application No. 1017595.8. (5 pages).
(Continued)

*Primary Examiner* — Ula C Ruddock
*Assistant Examiner* — Osei Amponsah
(74) *Attorney, Agent, or Firm* — Maine Cernota & Rardin

(57) ABSTRACT

A rechargeable battery is disclosed having electrode and separator structures which are made up of fiber-reinforced composite material, thereby allowing the battery itself to serve as an integral structural component. The utilization or efficiency of the rechargeable battery is considerably enhanced by rendering at least part of the matrix material of the electrodes and the separator porous, thereby to facilitate improved access to active sites on the electrodes, with the porosity in the separator allowing improved ion transport, both of which enhance cell operation. The porous structure also provides improved electrolyte containment and retention in the event of damage.

11 Claims, 6 Drawing Sheets

(51) Int. Cl.
*B05D 5/12* (2006.01)
*H01M 10/058* (2010.01)
*H01M 2/16* (2006.01)
*H01M 4/04* (2006.01)
*H01M 4/139* (2010.01)
*H01M 4/26* (2006.01)
*H01M 4/62* (2006.01)
*H01M 4/74* (2006.01)
*H01M 10/04* (2006.01)
*H01M 10/0585* (2010.01)
*H01M 10/12* (2006.01)
*H01M 10/28* (2006.01)
*H01M 10/30* (2006.01)
*H01M 10/46* (2006.01)
*B64C 3/26* (2006.01)
*H01M 10/32* (2006.01)
*H01M 10/34* (2006.01)
*H01M 4/02* (2006.01)

(52) U.S. Cl.
CPC .............. *H01M 4/622* (2013.01); *H01M 4/624* (2013.01); *H01M 4/625* (2013.01); *H01M 4/74* (2013.01); *H01M 10/04* (2013.01); *H01M 10/0585* (2013.01); *H01M 10/12* (2013.01); *H01M 10/281* (2013.01); *H01M 10/287* (2013.01); *H01M 10/30* (2013.01); *H01M 10/465* (2013.01); *B64C 3/26* (2013.01); *H01M 10/32* (2013.01); *H01M 10/345* (2013.01); *H01M 2004/021* (2013.01); *Y02E 60/122* (2013.01); *Y02E 60/124* (2013.01); *Y02E 60/126* (2013.01); *Y02T 10/7016* (2013.01); *Y10T 29/49108* (2015.01)

(56) References Cited

U.S. PATENT DOCUMENTS

| | | | |
|---|---|---|---|
| 6,203,941 | B1 | 3/2001 | Reichert et al. |
| 6,296,969 | B1* | 10/2001 | Yano et al. ................... 429/145 |
| 6,335,120 | B1 | 1/2002 | Bernard et al. |
| 2001/0012580 | A1 | 8/2001 | Reichert et al. |
| 2002/0068221 | A1 | 6/2002 | Watanabe et al. |
| 2003/0038610 | A1 | 2/2003 | Munshi et al. |
| 2003/0134197 | A1 | 7/2003 | Ikeda et al. |
| 2003/0224242 | A1 | 12/2003 | Kaito et al. |
| 2004/0241540 | A1* | 12/2004 | Tsutsumi et al. ............. 429/122 |
| 2005/0277025 | A1 | 12/2005 | Tsuda et al. |
| 2006/0204836 | A1 | 9/2006 | Kaito et al. |
| 2007/0077489 | A1 | 4/2007 | Bernard |
| 2008/0063942 | A1 | 3/2008 | Okuno et al. |
| 2009/0076159 | A1 | 3/2009 | Czarnik |
| 2009/0087742 | A1 | 4/2009 | Martinet et al. |
| 2009/0136846 | A1* | 5/2009 | Lee et al. ..................... 429/217 |
| 2012/0308887 | A1 | 12/2012 | Hucker et al. |

FOREIGN PATENT DOCUMENTS

| | | |
|---|---|---|
| EP | 0 856 898 A2 | 8/1998 |
| EP | 1 195 832 A1 | 4/2002 |
| EP | 1 435 673 A1 | 7/2004 |
| GB | 1 208 703 A | 10/1970 |
| GB | 1 518 077 A | 7/1978 |
| JP | 53-85348 A | 7/1978 |
| JP | 56-82577 A | 7/1981 |
| JP | 56-84876 A | 7/1981 |
| JP | 8-329955 A | 12/1996 |
| JP | 9-102317 A | 4/1997 |
| JP | 10-3906 A | 1/1998 |
| JP | 10-162815 A | 6/1998 |
| JP | 11-3702 A | 1/1999 |
| JP | 2004-186075 A | 7/2004 |
| JP | 2006-92848 A | 4/2006 |
| WO | WO 93/00716 A1 | 1/1993 |
| WO | 00/36672 A1 | 6/2000 |
| WO | WO 2004/093213 A2 | 10/2004 |

OTHER PUBLICATIONS

International Search Report (Form PCT/ISA/210) dated Apr. 21, 2011, issued in corresponding International Application No. PCT/GB2011/050217. (3 pages).

International Search Report (Form PCT/ISA/210) dated May 9, 2011, issued in corresponding International Application No. PCT/GB2011/050219. (3 pages).

Notification Concerning Transmittal of International Preliminary Report on Patentability (Forms PCT/IB/326 and PCT/IB/373) and the Written Opinion of the International Searching Authority (Form PCT/ISA/237) dated Aug. 23, 2012, issued in corresponding International Application No. PCT/GB2011/050218. (9 pages).

Hucker et al., U.S. Appl. No. 13/577,877, entitle "Component Including a Rechargeable Battery" filed Sep. 19, 2012.

Hucker et al., U.S. Appl. No. 13/577,580, entitle "Component Including a Rechargeable Battery" filed Aug. 7, 2012.

International Search Report (PCT/ISA/210) issued on May 18, 20122, by the Britain Patent Office as the International Searching Authority for International Application No. PCT/GB2011/050218.

Search Report under Section 17(5) dated May 13, 2010.

* cited by examiner

Epoxy-first method, electrolyte access is reduced by the conformal coating of epoxy on the active materials particles PET-first sample, large spheres are ~5-10μm Ni(OH)2 particles, reticulated network is open-cell porous epoxy PEG-first sample, large spheres are ~5-10 μm Ni(OH)$_2$ particles, note open-cell porous epoxy matrix PEG-first sample, large spheres are ~5-10 μm Ni(OH)$_2$ particles, note clear access around particles Addition of ground salt gives larger scale porosity Addition of ground salt gives larger scale porosity

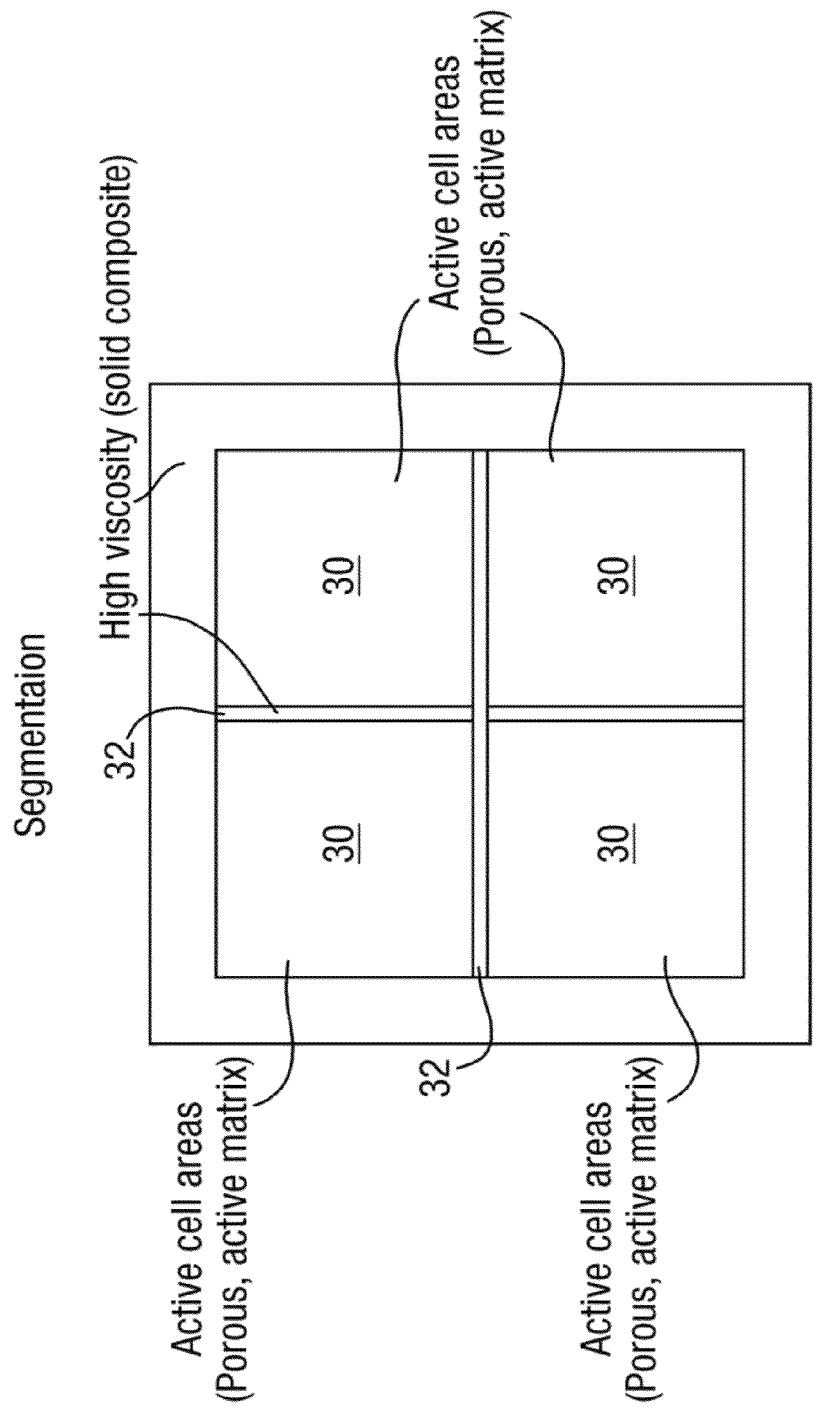

RECHARGEABLE BATTERIES

BACKGROUND TO THE INVENTION

This invention relates to rechargeable batteries and in particular, but not exclusively, to rechargeable batteries which are incorporated into a structural component such as, for example, a load-bearing element or wing surface.

BACKGROUND ART

We have previously proposed an architecture for such devices in which the electrodes are formed from respective fibre-reinforced layers of matrix material (such as epoxy). Various cell chemistries are possible and will be well known to those skilled in the art. The matrix material of the electrodes contains an electro-chemically active material together with a conductive additive such as carbon powder which acts as a current collector, passing current from the electro-chemically active material to the fibres of the fibre-reinforcing layer, which are electrically conducting. As an example therefore, in a nickel zinc cell, the electro-chemically active material of the anode may be nickel hydroxide particles and that of the cathode may be zinc oxide particles. The separator layer may comprise a fibre-reinforcing composite material in which the fibres are non-conducting, with the matrix material containing an aqueous electrolyte which in the case of a nickel zinc cell may be an aqueous solution of potassium hydroxide.

OBJECTS OF THE INVENTION

There is increasing demand for higher battery gravimetric or volumetric efficiency in terms of specific energy (Watthours per kg) and this requires the utilisation of the active material in the anode and cathode to be increased.

SUMMARY OF THE INVENTION

Our researches have shown that the utilisation of the active materials can be substantially increased by providing greater surface contact between the active material particles and the electrolyte. A potential difficulty with existing structures is that the adhesion between the active material and the matrix material required to retain the active material in conventional matrix materials can reduce the amount of surface exposed to the electrolyte and hence result in low utilisation. Normally great care is taken in the production of fibre-reinforced plastics materials to avoid the inclusion of voids, bubbles etc in the matrix material, but we have found that it is possible to introduce a level of porosity into such structures to enhance the electrical storage properties whilst still providing suitable mechanical properties of the structure.

Accordingly, in one aspect, this invention provides a method of producing a rechargeable battery comprising two electrode layers separated by a separator layer, the electrode layers and separator layer together defining a fibre-reinforced composite material, which method includes the step of forming at least one of the electrode or separator layers by:

contacting a fibre reinforcing layer with an active mixture including a settable or curable matrix material and a porogen and, where said layer is an electrode layer, an active particulate material;

allowing said matrix material to set or cure in contact with said fibre-reinforcing layer; and thereafter removing said porogen to provide a composite matrix material having a porous structure including pores allowing at least one of ion transport and surface access to said active particulate material.

By this arrangement it is possible to generate interconnected, micron scale pores from a castable matrix material (such as liquid resin). This can be used directly to infiltrate the fibres making up the fibre-reinforcing layer (e.g. carbon or glass fibres). This method is compatible with a wide range of conventional composite manufacturing processes such as wet lay up, resin transfer moulding (RTM), vacuum-assisted RTM (VARTM), pre-pregging etc.

In the electrode layers, porosity facilitates electrolyte access to active sites whilst, in the separator layer, the porosity allows improved ion transport. Furthermore, the porosity provides improved electrolyte containment in the event of damage as compared to cells where the electrolyte is contained in a non-porous volume.

The term 'porogen' is used in the conventional sense of a chemical compound that may be introduced into the composite and which essentially reserves space in the composite whilst the composite is being laid up or moulded but, once initial set up has been concluded, which may be removed, e.g. by diffusion, dissolution or degradation, thereby inducing porosity. The porogen may be a gas, liquid or solid. Some preferred porogens can be liquid at room temperature or a waxy solid, depending on their molecular weight.

In order to enhance the performance of the battery, it may be advantageous to provide a porous structure in which there are different pore sizes. For example, it may be useful to have relatively narrow porous passages which open out into larger reservoirs at different locations through the composite. Accordingly, the mixture may contain different porogen materials adapted to provide a porous structure with pores of different dimensional properties, such as mean transverse dimension.

Although the battery could be a stand alone item, it is preferred that the components thereof make up a structural component.

Thus the structural component can be any one of a wide range of structural materials that provide additional or primary power storage media without adding significant mass or volume to the equipment or vehicle of which they form part. For example, the structural component may be a primary, secondary or tertiary structural element in a vehicle for space, air, land, water and/or underwater use. The structural component may be: a wing skin on an unmanned air vehicle (UAV); the body panel on a hybrid electric automobile; the free flooding hydrodynamic hull of a submersible remotely operated vehicle (ROV); a satellite panel, or a hull or bulkhead for a boat. On land, the structural component may be a structural element in a permanent, semi-permanent or temporary building. Thus the structural element may be a wall panel in a portable building, a room divider, a suspended ceiling panel, a door, a window frame. Elsewhere, the structural component may be a structural element in an electronic device. Thus, it may form the casing for personal communications equipment or the substrate for a printed circuit board. Still further, the structural component may form a structural element in energy capture or renewable energy systems or equipment. Thus, it may form part of a support structure for a solar panel array or a casing, or a blade for a wind turbine.

Whilst the invention has been described above, it extends to any inventive combination or sub-combination of the features set out above, or in the following description, drawings or claims.

DESCRIPTION OF THE DRAWINGS

By way of example only, various embodiments of rechargeable battery in accordance with the invention will now be described in detail, reference being made to the accompanying drawings, in which:

FIG. 4 is a top plan view of a segmented electrode structure in accordance with an aspect of this invention.

DESCRIPTION OF THE PREFERRED EMBODIMENT

The embodiments of rechargeable battery disclosed below have electrode and separator structures which are made up of fibre-reinforced composite material, thereby allowing the battery itself to serve as an integral structural component. The utilisation or efficiency of the rechargeable battery is considerably enhanced by rendering at least part of the matrix material of the electrodes and the separator porous, thereby to facilitate improved access to active sites on the electrodes, with the porosity in the separator allowing improved ion transport, both of which enhance cell operation. The porous structure also provides improved electrolyte containment and retention in the event of damage.

In the embodiments below, a porogen such as e.g. polyethylene glycol (PEG) is used to generate micro-scale porosity in the epoxy resin which forms a matrix material for the electrode or separator structures. Thus, the porogen is typically a water-soluble polymer, although other suitable solvents and materials are not excluded. Reference is directed to US2008/0210626 which describes a suitable technique, and the contents thereof are incorporated herein by reference. This method may be used alone or in combination with soluble sacrificial fillers which are selected to be insoluble in the porogen but soluble in the same solvent which is used to flush out the porogen after the matrix material has cured. A typical sacrificial filler material is common salt (sodium chloride) with water being used to remove both it and the porogen.

Figure 1:
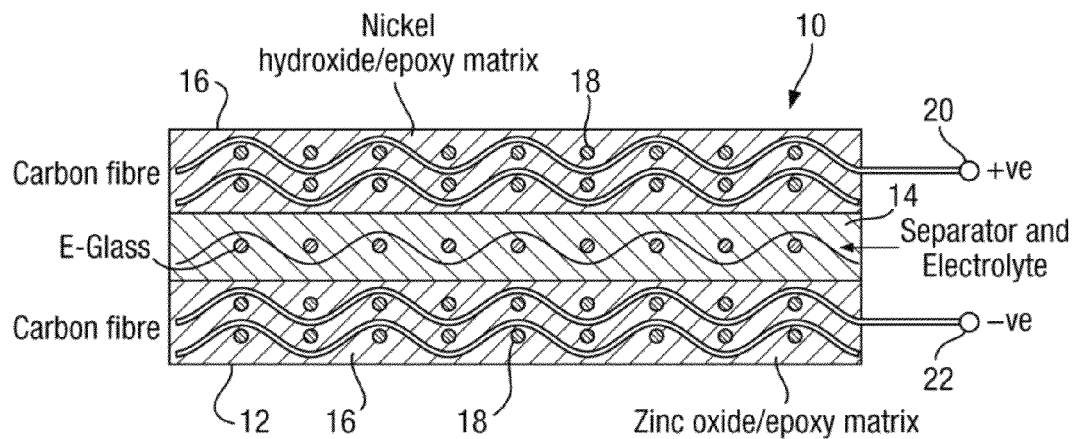
FIG. 1 is a general schematic cross-sectional side view of a typical configuration according to this invention.

Referring to FIG. 1, the basic structure of the rechargeable battery is a sandwich construction in which an anode structure 10 and a cathode structure 12 are separated by a separator structure 14. The anode and cathode structures are made of a fibre-reinforced composite layer in which porosity has been induced in the matrix material 16 to improve performance. The fibre-reinforcing layer 18 in the electrodes is made of electrically conducting fibre such as carbon fibre, which acts as a current collector. The matrix material is loaded both with an electro-chemically active material and a conducting additive (such as carbon

| Cell type | +ve active material | −ve active material | Electrolyte |
|---|---|---|---|
| Nickel-zinc | Ni(OH)$_2$, nickel hydroxide | ZnO, zinc oxide | 40% KOH solution (aqueous) |
| Nickel-iron | Ni(OH)$_2$, nickel hydroxide | Fe$_3$O$_4$, iron oxide | 40% KOH solution (aqueous) |
| Lead-acid | PbO$_2$, lead oxide | Pb, lead | 4.2M H$_2$SO$_4$ solution (aqueous) |

| Cell type | +ve active material | −ve active material | Electrolyte |
|---|---|---|---|
| Lithium ion | Carbon | LiCoO$_2$ | LiPF$_6$ dissolved in EC-DMC |

LiCoO$_2$ = lithium cobalt oxide, EC = ethylene carbonate, DMC = dimethyl carbonate generated electro-chemically at the active material to the electrically conducting fibre which passes to a terminal 20,22. The active material will depend on the particular cell chemistry. Typical possible cell chemistries are given below, but this is not an exhaustive list. The typical mean particle side of the active particles is between 5 and 10 μm in one specific embodiment.

Figure 2:
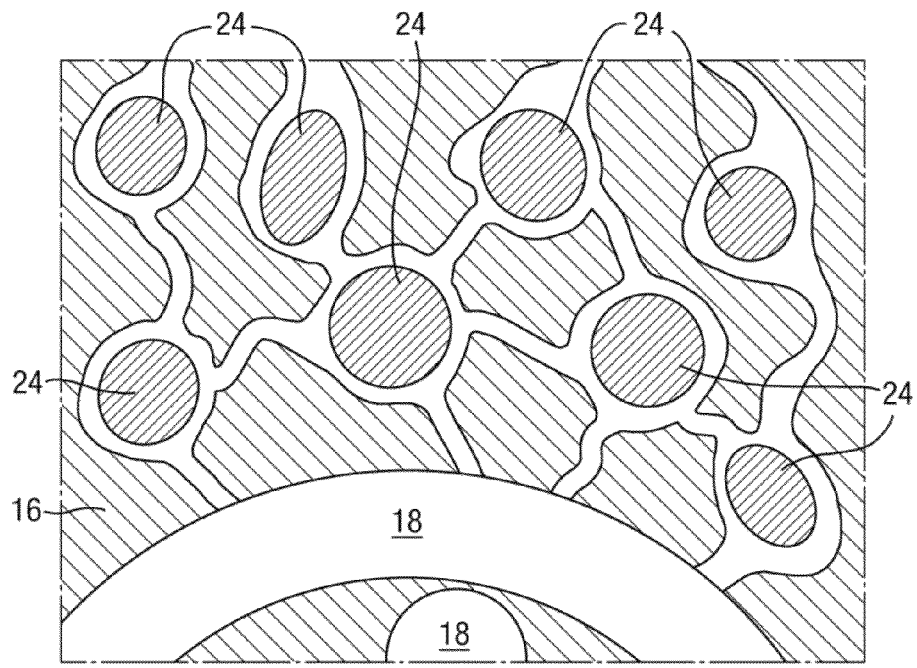
FIG. 2 is a schematic view representing the porous structure of one of the electrodes in the embodiment of FIG. 1.

As seen schematically in FIG. 2 and in the SEMs of FIGS. 3(a)-3(f), the porosity of the matrix is such as to ensure that there is good retention of the active particles within the matrix material whilst providing increased surface access to the particles. As will be seen therefore, the preferred geometry is for the active particles 24 to be held in slightly oversized pockets so that the electrolyte can contact a substantial proportion of the surface of the particle. Without such porosity, a substantial proportion of the surface of each particle is enveloped by the matrix material, thus preventing surface contact with the electrolyte.

By contrast, it is preferred that the carbon powder or other conducting additives are not exposed to the electrolyte as this could contribute to a reduced charging efficiency and/or cell degradation.

Turning to the separator structure 14, here the requirement is simply for containment of the liquid electrolyte material an open cell porous structure which allows good ion transport and there is no requirement for the porous matrix 26 to include solid active particles.

Example 1

In this Example suitable matrix materials were prepared for impregnating a glass fibre sheet material in order to provide a separator structure for a battery, using different porogen:epoxy ratios to provide different levels of porosity. 4.1 g of Struers EpoFix was mixed with 0.5 g EpoFix hardener and a measured mass of PEG200 was added as a porogen. The materials were spread onto a non-stick film and cured for 12 hours at 60° C. Once cured, sample sections of the films were cut to size and soaked in water overnight to dissolve the porogen. The films were then oven dried at 60° C. for 2 hours. The change in mass was used to determine the average porosity with different mass ratios of PEG to epoxy. The results are given in the table below.

| Mass ratio PEG$_{200}$:EPOXY | Average Porosity % |
|---|---|
| 1:1 | 22 |
| 2:1 | 38 |
| 3:1 | 60 |

Thus a separator structure may be made by mixing Struers EpoFix resin suitably loaded with PEG200 and impregnating 200 gsm E-glass fabric with the mixture, allowing the material to cure, and removing the porogen.

Turning to manufacture of the electrodes, in our studies, PEG was initially mixed with active material pastes made up of the dry ingredients mixed with epoxy as a binder used to create the active electrodes of the structural battery in order to give more porosity such that electrolyte access (and hence material utilisation and energy storage capacity) was improved. Examination by SEM of cured porous electrode materials incorporating active material particles revealed a surface film of epoxy resin which was observed to reduce electrolyte access to the active material particles (see SEM in FIG. 3(a)).

We observed that whichever of PEG or epoxy resin first came into contact with the ingredients of the electrode material (i.e. the electrochemically active material particles and the carbon powder) would create a surface film on these particles. This observation suggested that the order of mixing could have a major influence on the resulting microstructure of the electrodes and could be used advantageously.

Example 2

In this Example, the effect of the order of mixing the materials was assessed.

Electrode pastes were made up from the following ingredients:

4.1 g Struers Epofix resin, 0.5 g of EpoFix hardener, 0.35 g of carbon powder, 3 g of electrochemically active material ($Ni(OH)_2$ or $ZnO$) of mean particle size between 5 μm and 10 μm, and 12.3 g of PEG200.

For the first set of electrodes the dry ingredients were mixed with the epoxy resin and then the PEG was added, whilst for the second set the dry ingredients were mixed with the PEG first and then the epoxy was added. Equal masses of epoxy pastes were used to from composite electrodes on plain weave 200 gsm carbon fibre fabrics. The electrodes were cured and soaked to remove the residual PEG. They were then assembled into cells and filled with electrolyte (40% KOH solution saturated with approximately 50 g/l of ZnO added). Capacity tests were made and the energy density for the epoxy-first sample was measured as 0.28 Wh/kg whereas the PEG-first sample gave an energy density of 2.6 Wh/kg. SEM examination of the PEG-first sample showed exposed active material particles and clear breaks between them and the surrounding epoxy resin which allowed improved electrolyte access (see SEMs in FIGS. 3(b) to (d)).

A third variant on this method is to premix the epoxy/hardener and PEG before combining this with the dry ingredients. This gives good access and better mechanical retention of the particles as there is some wetting with epoxy. Energy densities are similar to the PEG-first method. In another technique, in order to reduce exposure of the carbon powder or conductive additive to the electrolyte, the conductive additive particles may be mixed with the resin to provide one mixture, and the active material mixed with the porogen to wet it and provide another mixture, with the two mixtures themselves then being combined.

We have also found that the porogen acts as a solvent in uncured resin and so allows a larger amount of active material to be incorporated in a workable mixture. This allows considerable flexibility because it allows the designer to choose on the one hand a lower viscosity resin which improves processing and mechanical performance of the composite material as it improves the wet out of the reinforcement fibre. On the other hand, the ability to incorporate a larger amount of active material allows higher loadings for a given workability, giving more active material relative to resin content and so improving the utilisation and storage capacity. Thus, typical mixtures (before addition of PEG) become unworkably stiff at relatively low volume fractions of powder (4.1 of epoxy and 0.5 g hardener, plus 3 g of active power was the limit) and will not wet out the reinforcing fabric effectively. Addition of PEG at a ratio of 3:1 relative to the mass of epoxy allowed the active material content to be increased to 15 g in some cases whilst still retaining workability and wetting. The PEG can, of course be removed once the resin has cured.

Figure 3A:
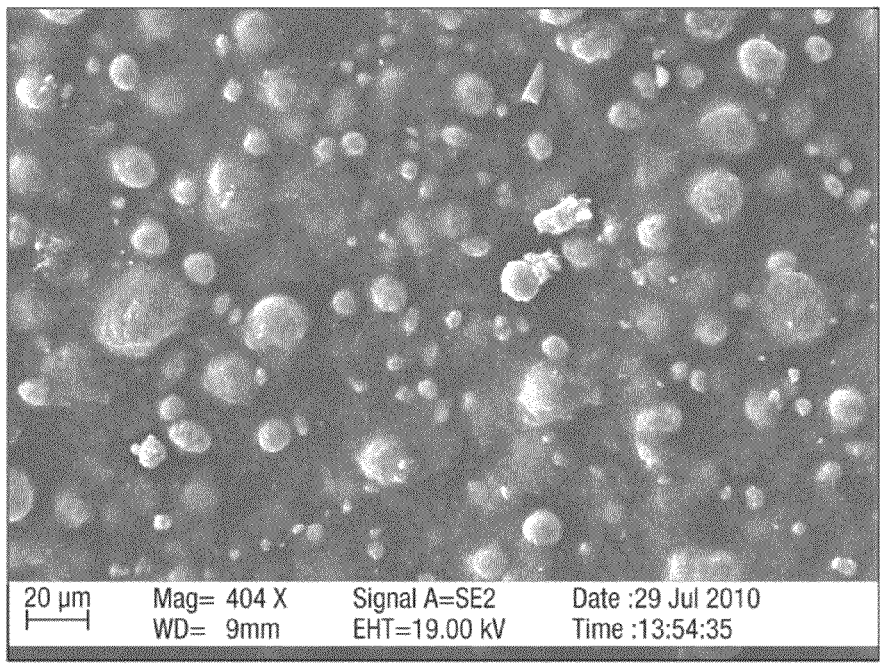
FIGS. 3(a) to (f) are SEM images of part of an electrode structure of embodiments of this invention showing the active materials provided in a porous matrix.
Figure 3B:
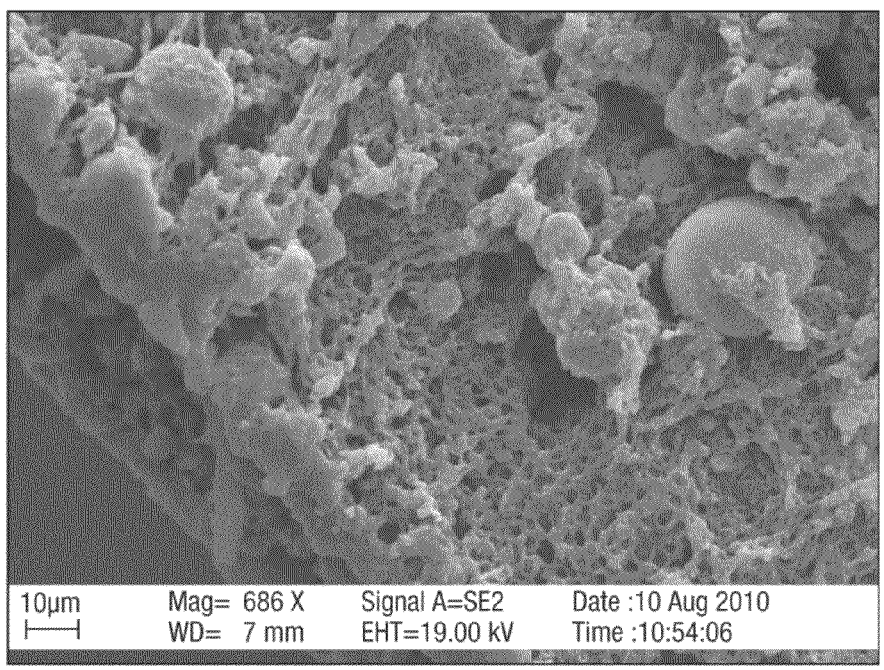
Figure 3C:
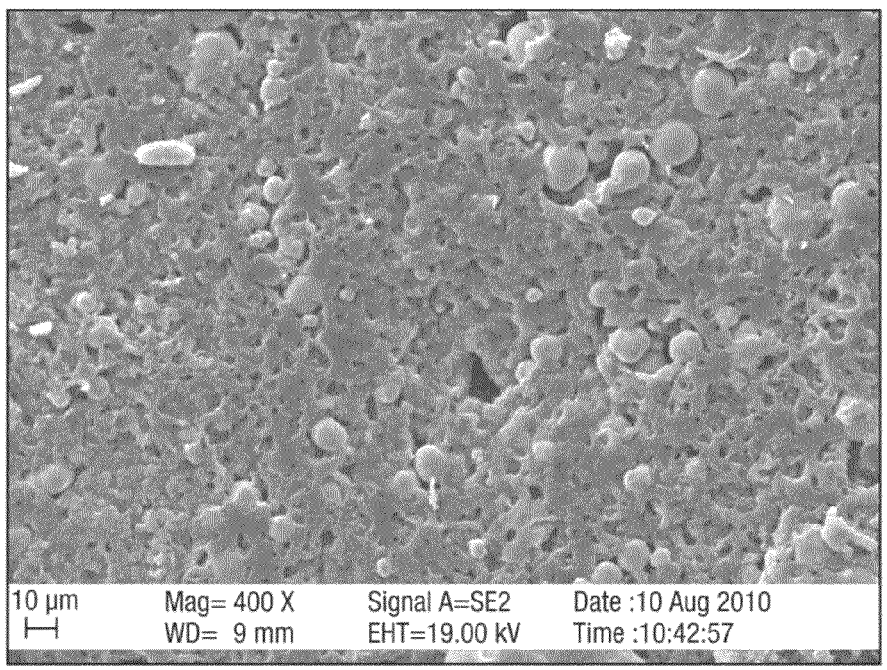
Figure 3D:
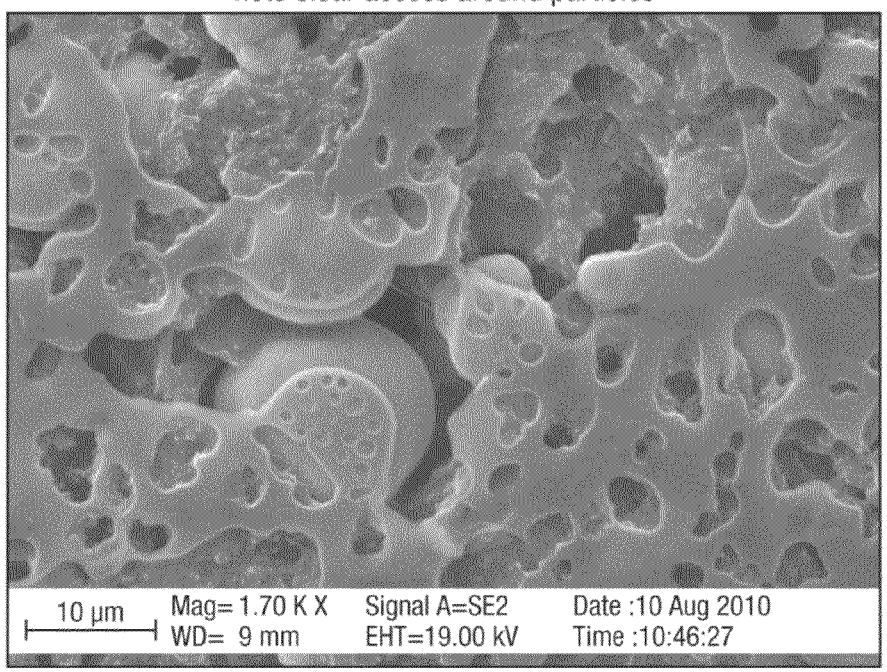
Figure 3E:
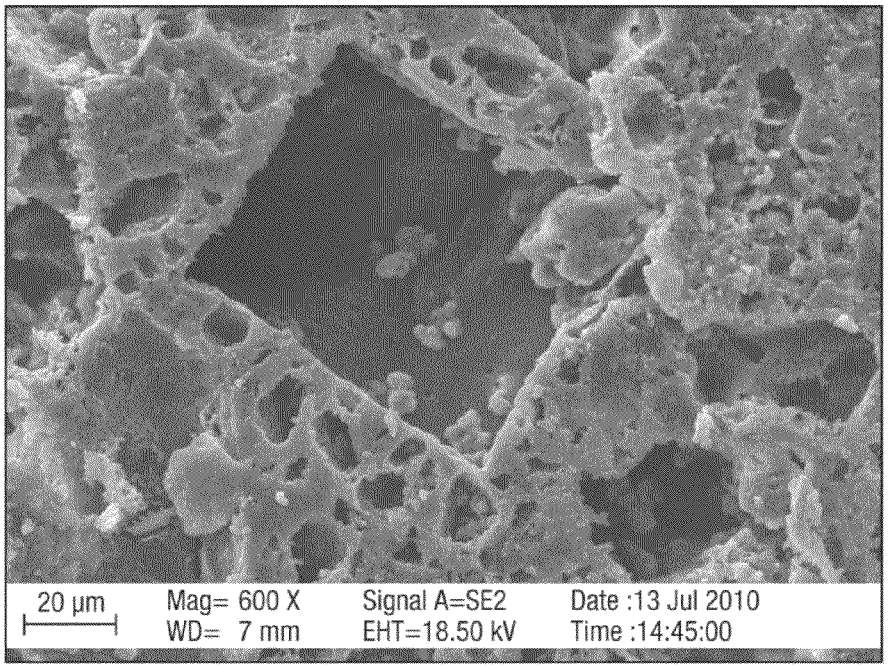
Figure 3F:
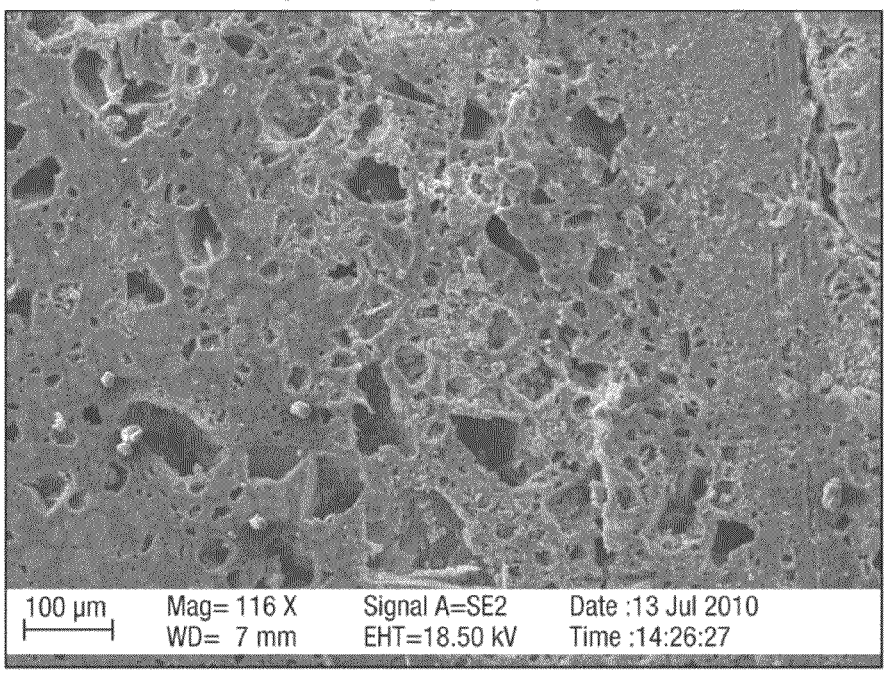

In order to provide multi-modal porosity in which narrow gauge pores open out into larger "reservoir" pores, another porogen may be added such as ground common salt (sodium chloride); the SEMs in FIGS. 3(e) and (f) show such structures.

Example 3

In order to make up a rechargeable battery first and second porous electrode layers are prepared by making up a respective first and second matrix material epoxy mixtures by one or more of the methods described above and applying them to impregnate layers of conducting carbon fibre reinforcing layers. A porous separator layer is then made by one or more of the methods described above. The various layers may then be partially cured before assembling the electrode:separator:electrode structure to reduce moving or mixing of the ingredients, or they may be assembled in their uncured states. After curing the porogen is flushed out with, for example, warm water and the structure allowed to dry. Electrolyte is then introduced into the cell by vacuum and/or high pressure and/or by simple immersion to induce a capillary action. On particular samples, fill or drain points may be formed in the cell to provide leakproof access through one of the electrode layers. The electrolyte again may be infiltration into the separator layer by vacuum and/or pressure.

In another aspect, the methods and apparatus set out above may be modified so as to provide a segmented (porous:non-porous) structure. There are a number of applications where segmentation may be advantageous. Firstly, for containment of the electrolyte it is desirable to provide a barrier or containment region which is non-porous and which therefore ensures that the electrolyte is contained in the porous structure rather than leaking away or wicking. Also, it may be required to provide a non-porous barrier region to provide electrical insulation, for example where a number of cells are stacked in composite layers making up a structural component. Thus, it may be required to provide an insulating layer of non-porous material between each of the groups of layers making up a cell. Furthermore, there may be a requirement for there to be hard points which are required to have enhanced compressive or other structural strength relative to the porous structure so that, for example, the structural element incorporating the battery can be secured to another structural element and withstand significant loads. In a similar manner, it may be required to provide stiffening or strengthening of a composite incorporating the battery in various regions.

A potential problem with any such structure where a fibre-reinforcement layer to be impregnated with regions of different matrix material is that a matrix materials tend to be of quite a low viscosity to enable them to be drawn into the fibre layer by capillary action to achieve good wetting out. However, this also means that the same capillary action will tend to cause the uncured matrix material to bleed away from the area in which it has been applied and so this makes designation or limiting the areal extent if two matrix materials are required in different areas of the same fibre layer.

We therefore describe below, various methods in which a first and second matrix material (e.g. an active matrix material and a barrier matrix material) can be applied in specified regions with little or no bleeding, by suitable modulation of the viscous properties of one or both. In particular, a selected one of the active or barrier material may be modified to have a relatively high viscosity and the other to be relatively low viscosity. The relatively high viscosity material is selected to have viscosity such that wet out is still achieved without significant bleed. This is applied to the fibre-reinforcing layer first and caused to impregnate the desired area. The other matrix material, at a lower viscosity may then be applied to the fibre-reinforcing layer with the capillary action ensuring that the second matrix layer occupies those parts of the fibre layer not impregnated by the first material. It will be appreciated that either of the active matrix material or the barrier matrix material may be the high viscosity material that is applied first, although, in many instances, as the barrier material may be circumscribing an active material region, the barrier material will be applied first as a relatively high viscosity material.

Accordingly, in one embodiment a high viscosity matrix resin may be used for the solid or barrier layer. Lower viscosity resins could also be modified through addition of fillers such as fumed silica to increase the viscosity. The viscosity is chosen so that the resin is able to infiltrate the reinforcement fibres locally to provide good mechanical properties and wet out but is sufficiently high that it prevents the resin from wicking too far into adjacent areas, therefore leaving them free to be filled with electro-chemically active matrix materials which may then have a high degree of porosity generated by any of the methods set out above. This gives a highly efficient utilisation of active materials but has a lower mechanical strength.

Example 4

In this example, the active material is provided in a relatively high viscous form, for example by using a high molecular weight, water-soluble binder such as PEG10000 with a small amount of structural binder such as epoxy resin. A typical mass ratio is 2:1 PEG:epoxy or greater.

The mixture thus provided is stiff and waxy and so may be applied either at elevated temperature or in solution in an organic solvent such as methanol, to allow it to penetrate the reinforcement fibres. Once set, the barrier matrix material is applied, at a relatively low viscosity to wet out those areas not impregnated by the active matrix material treated areas of fabric. The water-soluble binder may then be dissolved to leave the porous active materials in the desired pattern. Selective deposition processes such as stencilling, screen printed etc may be used to deposit the required pattern.

Figure 5:
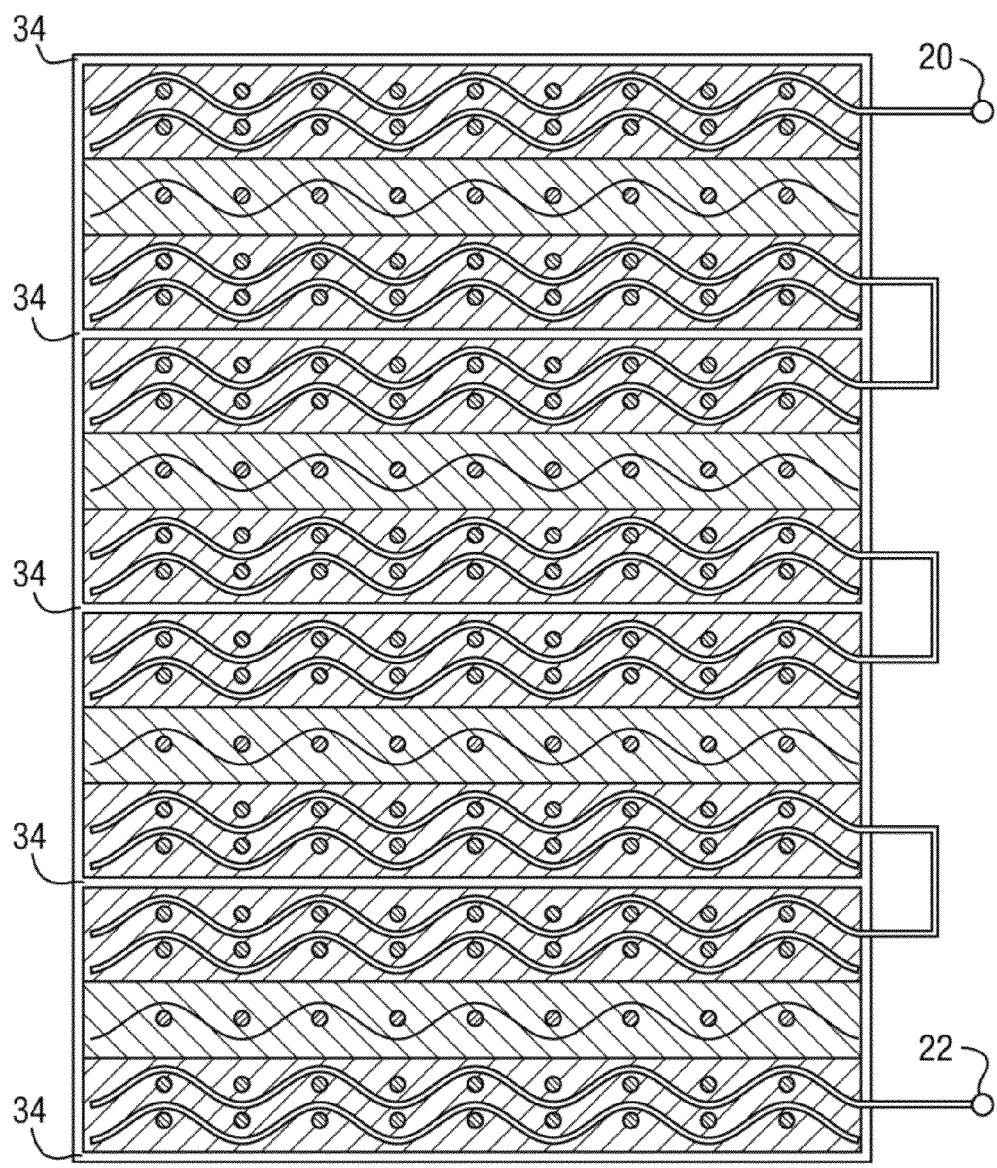
FIG. 5 is a cross-sectional view showing a stacked battery structure with intervening segmented or barrier layers.

The selection of appropriate viscous materials for the active and barrier materials can be used to provide a number of different geometries. For example, as shown in FIG. 4, a number of active cell areas 30 comprising an active cell matrix material incorporating active ingredients and impregnating the fibre-reinforcement layer, are separated by solid composite barrier regions 32 to divide the arrangement into four quadrant cells separated from each other and surrounded by a containment layer. In another arrangement, as shown in FIG. 5, the technique is used to provide solid, insulating layers 34 above and below each cell to provide insulation.

The invention claimed is:
1. A method of producing a rechargeable battery having two electrode layers separated by a separator layer, the electrode layers and separator layer together defining a fibre-reinforced composite material, which method comprises:
forming at least one of the electrodes by:
making an active mixture by:
mixing an active particulate material with a porogen; and thereafter mixing the combined particulate material and porogen with a settable or curable matrix material;
contacting a fibre-reinforcing layer with the active mixture;
allowing said matrix material to set or cure in contact with said fibre-reinforcing layer; and
thereafter removing said porogen to provide a composite matrix material having a porous structure including pores allowing at least one of ion transport and surface access to said active particulate material.

2. A method according to claim 1, comprising:
forming respective first and second electrode layers and a separator layer to provide a structural component of fibre composite material incorporating a rechargeable battery.

3. A method according to claim 1, wherein said active mixture contains at least two different porogen materials thereby to provide a porous structure with pores of different dimensional properties in the or each layer.

4. A method according to claim 1, in which an electrode layer is formed, wherein said active mixture includes a particulate conducting material for facilitating passage of electrical current to or from said active material in use.

5. A method according to claim 1, wherein:
said active mixture is made by mixing the particulate material with a porogen, whereby said porogen wets the particulate material to provide a surface layer of porogen over a substantial proportion of surface layers of particles making up the particulate; and
thereafter mixing the combined particulate material and porogen with said settable or curable matrix material.

6. A method according to claim 1 wherein:
said active mixture is made by mixing the matrix material and the porogen; and
thereafter mixing the combined matrix material and porogen with said particulate materials.

7. A method according to claim 1, wherein a weight by weight ratio of particulate material to matrix material is in excess of 1:1.

8. A method according to claim 1, comprising:
applying said active mixture to a preselected region of said fibre-reinforcing layer; and
applying a barrier mixture to another preselected region of said fibre-reinforcing layer, the barrier mixture including a settable or curable matrix material which sets or cures to provide a matrix with little or no porosity.

9. A method according to claim 8, wherein one of said active mixture and said barrier mixture has a relatively high viscosity and the other thereof has a relatively low viscosity, with said one mixture being applied to said fibre-reinforcing layer before application of said other mixture, thereby to prevent or reduce wicking of the said other mixture into areas occupied by said one mixture.

10. A method according to claim 9, wherein said one mixture is applied through only part of a thickness of the fibre-reinforcing layer, with a remainder thereof being impregnated by said other mixture, thereby to provide a barrier layer.

11. A method according to claim 9, wherein said one mixture is applied to a region of said fibre-reinforcing layer which at least partially circumscribes a region to which said other mixture is subsequently applied.

* * * * *